United States Patent [19] [11] 3,735,266
Amitay [45] May 22, 1973

[54] METHOD AND APPARATUS FOR REDUCING CROSSTALK ON CROSS-POLARIZED COMMUNICATION LINKS

[75] Inventor: Noach Amitay, Livingston, N.J.

[73] Assignee: Bell Telephone Laboratories, Incorporated, Murray Hill, N.J.

[22] Filed: Dec. 20, 1971

[21] Appl. No.: 209,652

[52] U.S. Cl. ..........325/60, 179/15 BC, 179/15 BP, 325/42, 325/56, 325/62, 325/63, 325/306, 325/369, 325/472, 328/162, 328/166, 328/167, 333/2, 333/15, 343/100 PE

[51] Int. Cl. ..........H04b 1/00

[58] Field of Search ..........179/15 BC, 15 BP; 325/42, 43, 56, 60, 62–64, 65, 47, 48, 56, 306, 369, 320, 324, 472, 305; 328/162, 163, 166, 167; 333/2, 10, 7, 15–18, 24.2; 343/100 PE

[56] References Cited

UNITED STATES PATENTS

| | | | |
|---|---|---|---|
| 3,384,824 | 5/1968 | Grenier | 328/166 |
| 2,607,851 | 8/1952 | Pfeger | 333/16 |
| 2,102,138 | 12/1937 | Strieby | 325/65 |
| 2,866,000 | 12/1958 | Caruthers | 325/65 |
| 2,465,531 | 3/1949 | Green | 333/16 |

*Primary Examiner*—Albert J. Mayer
*Attorney*—W. L. Keefauver

[57] ABSTRACT

A method and apparatus for reducing crosstalk in microwave transmission systems in which information is transmitted in two cross-polarizations or channels. Utilizing a frequency-diversity system, a pilot signal is transmitted with each of the channels; and the receivers are equipped with means for detecting components of the pilots received in each channel to indicate the level of crosstalk. The components of the pilots are processed at the receiver in a predetermined manner to generate control signals proportional to the degree of correction required to cancel the crosstalk. The cancellation is accomplished by RF or IF control circuits in either feedback or feed-forward arrangements which, in response to the control signals, operate directly upon the received signals to cancel the crosstalk automatically. The technique is theoretically adaptable to any number of distinct linear polarizations or channels and is particularly suited for use in satellite communication links.

6 Claims, 3 Drawing Figures

Patented May 22, 1973 3,735,266

2 Sheets-Sheet 1

METHOD AND APPARATUS FOR REDUCING CROSSTALK ON CROSS-POLARIZED COMMUNICATION LINKS

BACKGROUND OF THE INVENTION

This invention relates to microwave transmission systems, and more particularly, to arrangements for reducing crosstalk in microwave transmission systems in which two or more cross-polarized information channels are employed.

The crowding of the frequency spectrum in electromagnetic transmission systems has led to an extremely limited availability of channels for radio and satellite communications. One technique for increasing the communicating capacity of a system is to utilize multiple polarizations for a given frequency. In principle, if the polarization discrimination in a system is sufficiently good, the same frequency-band can be shared by the various cross-polarization modes of transmission and the capacity of the system can be greatly increased.

When such a technique is employed, it is required that the unwanted crosstalk induced between the polarizations during transmission and reception of information signals be held at or below an acceptable level. This level is generally dictated by the quality of the information transmission required in each particular system.

In U. S. Pat. No. 3,500,207, issued to C. L. Ruthroff on Mar. 10, 1970, apparatus is described for correcting polarization rotation in a microwave system in which information is transmitted in two spatially orthogonal polarizations. The technique assumes that the relative orientation of the two polarizations is preserved in the communication path. A single pilot signal transmitted in one of the polarizations is detected at the receiving station as an error signal in the other polarization indicating the degree of misalignment. The error signal is then fed back to a polarization rotator which rotates the entire received signal to minimize the error and to maintain alignment of the received signal with the polarization selective components of the receiver.

While the apparatus described in the above-mentioned patent is useful in alleviating the problem of crosstalk due to the uniform rotation of two cross-polarized information channels, the arrangement is strictly limited to that particular problem. It is desirable to have apparatus for reducing crosstalk in a system in which two or more distinct linear polarization information channels are involved. It is also desirable to have a system which corrects not only for the uniform rotation of cross-polarizations during transmission, but also for other arbitrary forms of crosstalk which are caused, for example, by the nonideal properties of the antennae.

SUMMARY OF THE INVENTION

The present invention provides for the reduction of crosstalk on microwave communication links in which information is transmitted in two or more distinct linear polarization channels. The transmitted information signal in each polarization is supplied with a frequency-diversity pilot signal. The components of the pilot signals in each of the polarizations are detected at the receiving station and used to produce complex coefficients which are indicative of the level of crosstalk induced between each channel during transmission and reception. The complex crosstalk coefficients are processed at the receiver in a predetermined manner to produce control signals which are proportional to the degree of correction required in each channel to cancel the crosstalk. The control signals are in turn applied to electrical control circuits at the RF or IF levels in either feedback or feed-forward control arrangements which operate directly on the received information channels to cancel crosstalk automatically. By a continuous feedback or feed-forward of the control signals, the level of crosstalk in the information signals at the receiver is kept to a minimum.

Thus, it is an object of the invention to provide apparatus for reducing crosstalk on microwave communication links employing two or more distinct linear polarization channels.

According to a specific feature of the invention, the crosstalk cancellation apparatus comprises electrical control circuits of the RF or IF levels which operate directly upon the received information signals and do not require any mechanically moving parts.

According to an additional feature of the invention, the crosstalk cancellation can take place after the preamplification and mixing of the signals at the receiver so as not to affect the signal-to-noise ratio of the received information.

BRIEF DESCRIPTION OF THE DRAWING

These and other objects, features and advantages of the invention will be more readily understood from the following detailed description taken in conjunction with the drawing in which.

DESCRIPTION OF THE ILLUSTRATIVE EMBODIMENTS

Figure 1:
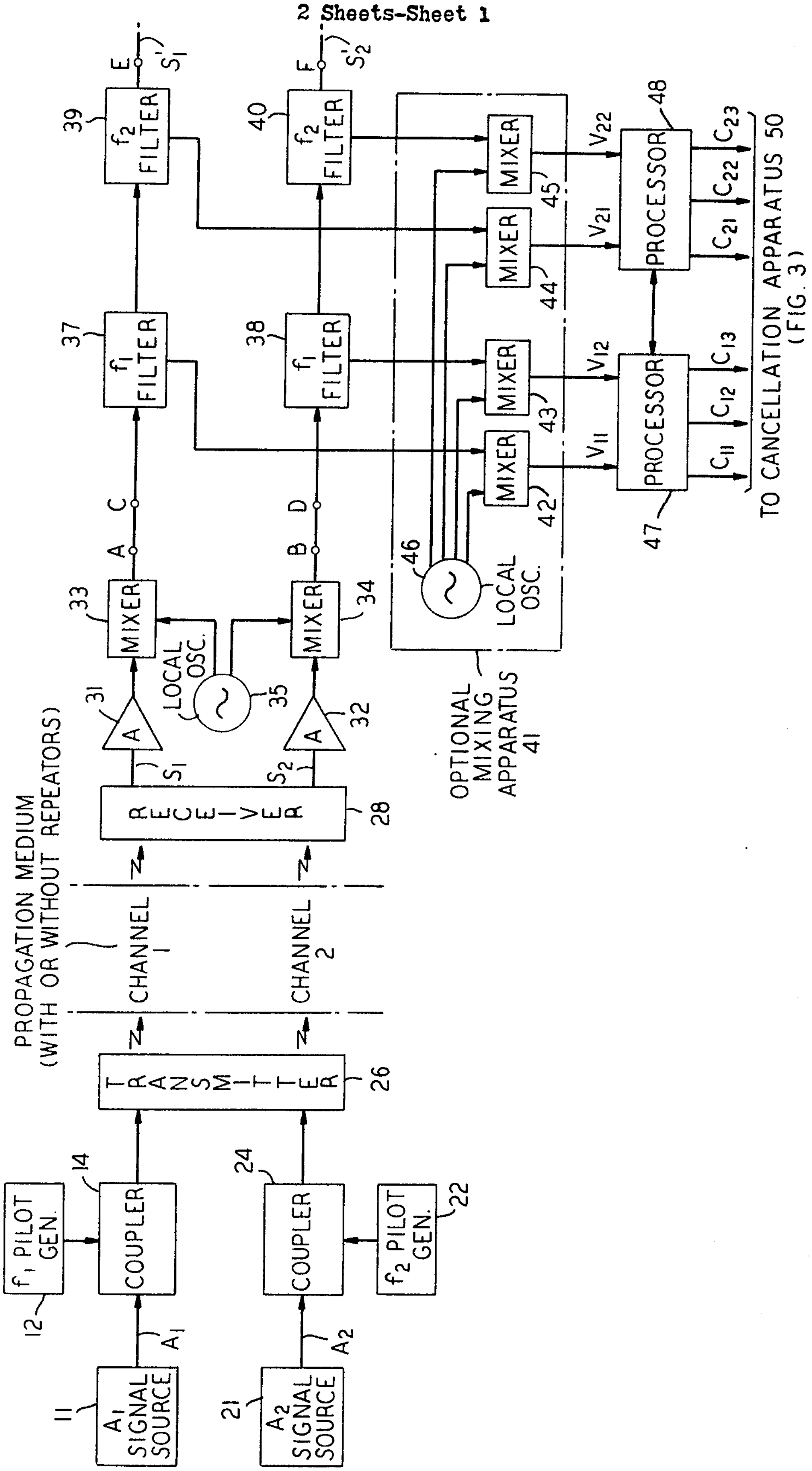
FIG. 1 is a partially schematic, partially block diagrammatic illustration of an illustrative embodiment of the invention.

In FIG. 1, there is shown, by way of example, an embodiment of the invention illustrating a point-to-point transmission system transmitting information signals $A_1$ and $A_2$ from station 26 and receiving the corresponding information signals $S_1$ and $S_2$ at receiving station 28.

Information signal $A_1$ is produced by signal source 11. A pilot signal at a frequency $f_1$ is generated in pilot generator 12 and coupled by coupler 14 to the signal $A_1$. The other information signal $A_2$ is produced by signal source 21. Another pilot signal is generated in pilot generator 22 at a frequency $f_2$ not equal to $f_1$ and coupled by coupler 24 to the signal $A_2$. The coupled signals are applied to transmitting station 26 which transmits cross-polarized output waves through a suitable propagation medium, typically the atmosphere, which may or may not include signal repeaters spaced at regular intervals along the length of the medium. The transmitted waves are illustratively in two distinct, mutually orthogonal polzrizations (i.e., channels) but with the same frequency band, thus doubling the usable capacity of the band. As will be made clear from the discussion hereinbelow, orthogonality of the polarizations of the channels is not necessary, however, and any two or more distinct linear polarizations are sufficient for purposes of the invention. The output waves including the pilots are received at receiving station 28 as signals $S_1$ and $S_2$ which include crosstalk (i.e., each signal $S_1$ and $S_2$ being received in the form of a linear combination of the original information signals $A_1$ and $A_2$, respectively).

At the receiver, $S_1$ and $S_2$ are first illustratively amplified by amplifiers 31 and 32, respectively, and converted to IF by mixers 33 and 34, respectively. Both mixers share a common local oscillator 35, thus preserving the relative phase between the signals in the two polarizations. Processing ofthe signals to remove crosstalk according to the invention is advantageously performed after preamplification and mixing at the receiver so as not to affect the signal-to-noise ratio of the received information.

Narrow-band channel dropping filters 37, 38, 39 and 40 are utilized at the receiving station to selectively separate components of the two pilot signals $f_1$ and $f_2$ from each of the two information channels. $S_1'$ and $S_2'$ at the far right-hand terminals E and F represent the received information signals with the pilots partially or completely removed but with the crosstalk.

The outputs from filters 37, 38, 39 and 40 are illustratively fed into the optional mixing apparatus 41 which includes mixers 42, 43, 44 and 45, respectively, connected to a second common local oscillator 46. Mixing apparatus 41 may be used to convert the IF pilot signal components from the filters to baseband frequencies, if such a conversion is desired. In any event, signals $V_{11}$, $V_{12}$, $V_{21}$, and $V_{22}$, whether at IF or baseband frequencies, are indicative of the level of crosstalk in the received signals $S_1$ and $S_2$. They are fed into the interconnected processors 47 and 48 which generate the control signals $C_{11}$, $C_{12}$, $C_{13}$, $C_{21}$, $C_{22}$, and $C_{23}$. The control signals, in the form of voltages or currents, are proportional to the degree of correction required in signals $S_1$ and $S_2$ in order to cancel the crosstalk. Processors 47 and 48 typically comprise conventional phase sensitive detectors and amplitude sensitive detectors to determine the phase and amplitude of the signals $V_{11}$, $V_{12}$, $V_{21}$, $V_{22}$ and either special purpose digital devices or analog devices which are capable of adding, subtracting, multiplying and dividing the various amplitude and phase values in a predetermined manner to generate the required control signals. The control signals are finally fed either forward (to terminals E and F of the receiver) or back (to terminals A and B of the receiver ) in a manner which will be more fully discussed below with regard to the apparatus of FIG. 3. The control signals with appropriate apparatus are utilized to operate directly upon received signals $S_1$ and $S_2$ to cancel crosstalk therebetween atuomatically. Automatic correction by the feedback or feed-forward mechanism provides continuous discrimination between the cross-polarized information channels at the receiver.

In the exmaple of FIG. 1, the two independent channels of the transmission system illustratively comprise signals with two distinct, orthogonal polarizations at the same frequency-band. It will become apparent from the description below that orthogonality of the polarizations of the channels is not necessary and that any two distinct linear polarizations are sufficient for the purposes of the invention. In addition, it will become apparent that more than two distinct linear polarization channels are possible according to the invention, especially in certain propagation media such as multimoded waveguides or cables.

It is useful, for purposes of explanation, to let $A_1$ and $A_2$ represent the complex amplitudes of the information signals in the two indpendent channels at the transmitting end of the system. $A_1$ and $A_2$ may be either the voltage or electromagnetic field components of the transmitted signals across the frequency-band of interest. Likewise, $S_1$ and $S_2$ may represent the voltages of field componenets of the information signals at the receiving end of the system.

Ideally, with no crosstalk, $S_1$ and $S_2$ at the receiver are directly proportional to $A_1$ and $A_2$, respectively, at the transmitter:

$$\left.\begin{array}{l} S_1 \sim A_1 \\ S_2 \sim A_2 \end{array}\right\} \quad (1)$$

However, due to the nonideal 'properties of typical propagation media and antennae and certain inherent characteristics of the transmitter and receiver (for example, differences between the transfer functions of the various channels in the transmitter and receiver), unwanted crosstalk or cross-polarization coupling takes place between the channels during transmission and reception. The signals at the receiver are therefore not typically proportional to the signals at the transmitter but may be represented by the following form:

$$\left.\begin{array}{l} S_1 = V_{11}A_1 + V_{21}A_2 \\ S_2 = V_{12}A_1 + V_{22}A_2 \end{array}\right\} \quad (2)$$

where $V_{11}$, $V_{21}$, $V_{12}$ *and* $V_{22}$ are complex coefficients representing the level of the desired components and the crosstalk components in signals $S_1$ and $S_2$.

Generally, the various crosstalk coefficients of Equation (2) can be frequency dependent within a particular frequency-band. However, crosstalk due to polarization rotation is not frequency dependent in and of itself. Moreover, within the main beam region of of the antenna, the polarization characteristics of well-designed antennae can be made substantially frequency independent in a 10 percent (± 5 percent) frequency-band. It is apparent, therefore, that the crosstalk coefficients in Equation (2) can be treated as constants with respect to frequency over a reasonable bandwith (10 percent). In any event it is possible for the purposes of the invention to divide a frequency-band in which the crosstalk coefficients are frequency dependent into sub-bands within which there is no appreciable frequency variation of the crosstalk coefficients.

Based upon the above-mentioned assumption, Equation (2) can be solved for $A_1$ and $A_2$, respectively, as follows:

$$\left.\begin{array}{l} A_1 = \left(S_1 - \frac{V_{21}}{V_{22}} S_2\right) \Big/ (V_{11}) \left(1 - \frac{V_{12}V_{21}}{V_{11}V_{22}}\right) \\ A_2 = \left(S_2 - \frac{V_{12}}{V_{11}} S_1\right) \Big/ (V_{22}) \left(1 - \frac{V_{12}V_{21}}{V_{11}V_{22}}\right) \end{array}\right\} \quad (3)$$

It is noted that the transmitted signals $A_1$ and $A_2$ can be reproduced at the receiver provided that sufficient information concerning the complex crosstalk coefficients can be obtained there.

Figure 2:
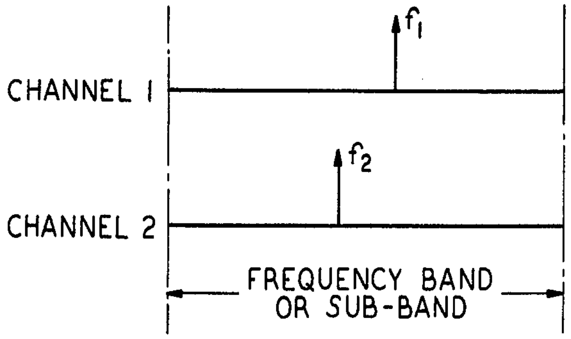
FIG. 2 illustrates the frequency-diversity pilot signals $f_1$ and $f_2$ positioned near the center of the frequency-band of the information channels 1 and 2 of the embodiment of FIG. 1.

This result is accomplished according to the invention by utilizing the frequency-diversity pilot signals $f_1$ and $f_2$ transmitted with each independent information channel. The pilot signals in each channel are at different frequencies as shown in FIG. 2. They typically have their amplitudes as well as their frequencies carefully stabilized according to conventional circuits in pilot generators 12 and 22 of FIG. 1. Basically, the pilot frequencies may fall anywhere within or outside the band or sub-band of the channels. It is advantageous, however, to facilitate the detection of and discrimination between the pilots at the receiver, that $f_1$ and $f_2$ be within the band of each channel close to the middle thereof, and sufficiently separated from one another as shown in the drawing.

Figure 3:
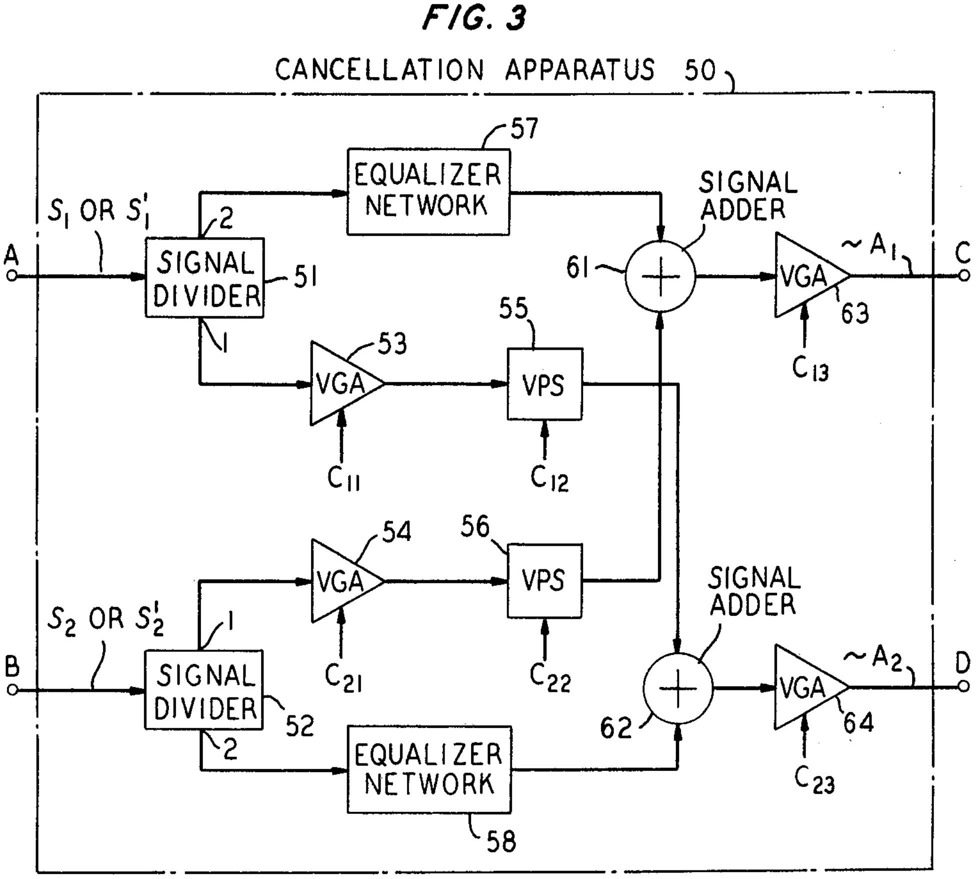
FIG. 3 is a partially schematic, partially block diagrammatic illustration of crosstalk cancellation apparatus embodied according to the invention for use in connunction with the embodiment of FIG. 1 in either a feedback or feed-forward control arrangement.

The levels of the $f_1$ and $f_2$ pilot signals present in each information channel are directly indicative of the respective crosstalk coefficients of Equation (2) since the pilots are subjected to the same transmission conditions as are the information signals. The control signals at the outputs of processors 47 and 48 are made to be proportional to the respective amplitudes and phases of the pertinent coefficients of Equation (3) as follows:

$C_{11} \sim - |V_{12}/V_{11}|$ $C_{12} \sim$ the angle of $V_{12}/V_{11}$ $C_{13} \sim |(V_{11})[1 - (V_{12}V_{21}/V_{11}V_{22})]|^{-1}$ $C_{21} \sim - |V_{21}/V_{22}|$ $C_{22} \sim$ the angle of $V_{21}/V_{22}$ $C_{23} \sim |(V_{22})[1 - (V_{12}V_{21}/V_{11}V_{22})]|^{-1}$ As was noted above, the control signals are employed according to the invention in either feed-forward or feedback control arrangements and used to cancel crosstalk automatically from signals $S_1$ and $S_2$. FIG. 3 illustrates an example of crosstalk cancellation apparatus 50 for use in conjunction with the apparatus of FIG. 1. Apparatus 50 is illustratively a two-port electrical control circuit including electrical components operative either at the RF or IF levels.

In a feed-forward cancellation arrangement, the terminals A and B of apparatus 50 of FIG. 3 are connected to the terminals E and F shown at the far right of the receiver of the system of FIG. 1. The signals $S_1'$ amd $S_2'$ are illustratively fed into signal dividers 51 and 52, respectively, which divide the signals into first and second identical components. The first components of the signals from dividers 51 and 52 are fed through variable gain amplifiers (VGA) 53 and 54, respectively, the gains of which are controlled by control signals $C_{11}$ and $C_{21}$, respectively. The same first components of the signals are then fed through variable phase shifters (VPS) 55 and 56, respectively, the phase delays of which are controlled by control signals $C_{12}$ and $C_{22}$, respectively. The second components of the signals from dividers 51 and 52 are illustratively fed through equalizer networks 57 and 58, respectively, which may be employed to compensate for any known phase and amplitude dispersions present within the frequency-band of the channels. The first component of the signal $S_2'$ and the second component of the signal $S_1'$ are then additively combined by signal adder 61. Additionally, the first component of the signal $S_1'$ and the second component of the signal $S_2'$ are additively combined in adder 62. These combined signals are finally passed through variable gain amplifiers 63 and 64, respectively, the gains of which are controlled by control signals $C_{13}$ and $C_{23}$, respectively. The resulting signals at terminals C and D of apparatus 50 are replicas of the information signals at the transmitting end of the system with the desired cancellation of crosstalk.

In a feedback cancellation arrangement, the terminals A, B, C and D, respectively, of apparatus 50 of FIG. 3 are connected to the corresponding terminals A, B, C, and D, respectively, at the receiving end of the system of FIG. 1. In substantially the same manner as described above for the feed-forward arrangement, the crosstalk in received signals $S_1$ and $S_2$ is automatically cancelled. The feedback arrangement produces at terminals C and D signals which are replicas of the transmitted information signals $A_1$ and $A_2$ and which still contain the pilot signals $f_1$ and $f_2$ to be processed.

The apparatus described hereinabove is especially suited for use in satellite communications systems employing signal frequency-bands or sub-bands within the 4 and 6 GHz common carrier bands. The crosstalk could be cancelled at the ground station where additional weight and volume are not objectionable. Without imposing strict restraints on the antenna design, it should be possible according to the invention to suppress crosstalk having a level of −10 dB to a level below −30 dB across a 0.5 GHz frequency-band in a ground-to-satellite-to-ground path.

To suppress the crosstalk in this staellite system by an additional 20 dB, the control signals would typically require amplitude tolerances of approximately ±0.85 dB and phase tolerances of ±5 degrees. It should be noted that the tolerances maintained in the processors of FIG. 1 and in the cancellation apparatus of FIG. 3 for the control signals primarily determine the level to which the crosstalk is suppressed at the receiver. Microwave integrated circuits and strip line components are available in the art and can be utilized in processors 47 and 48 and in cancellation apparatus 50 to maintain exceptionally close tolerances whenever required.

The transmission system described hereinabove may also be useful in terrestrial radio links, mobile radio, and commercial radio and television broadcasting. In most of these systems, only a single polarization is used. The good polarization discrimination of the apparatus of the invention would allow the communicating capacity of existing systems to ge greatly increased. It is also noted that although a one-way transmission system is shown in FIG. 1, the invention is in no way limited to one-way transmission. The embodiment of FIG. 1 can readily be modified to two-way transmission by one skilled in the art.

The extension of the invention to more than two distinct linear cross-polarized information channels should now also be readily apparent to one skilled in the art. The received signals in such a system would be of the following form:

$$S_1 = V_{11}A_1 + V_{21}A_2 + V_{31}A_3 + \cdots$$
$$S_2 = V_{12}A_1 + V_{22}A_2 + V_{32}A_3 + \cdots$$
$$S_3 = V_{13}A_1 + V_{23}A_2 + V_{33}A_3 + \cdots \quad (5)$$

Pilot signals at different frequencies $f_1, f_2, f_3, \ldots$ would be transmitted in each channel and used to indicate the pertinent crosstalk coefficients of Equation (5) at the receiver. It is only then necessary to solve Equation (5) for the signals $A_1, A_2, A_3 \ldots$ to determine the required control signals and the conditions on the corresponding processors (for example, processors 47 and 48 of FIG. 1).

The use of two or more distinct linear polarized channels is especially suited for systems in which the propagation medium is a coaxial cable or waveguide capable of propagating a plurality of independent modes with substantially identical propagation constants. The apparatus of the invention could be used with the simultaneous transmission of a plurality of independent channels in these modes to minimize crosstalk.

I claim:

1. A polarization diversity transmission system with apparatus for reducing crosstalk comprising in combination:

means for transmitting information signals in a set of two distinct linear polarizations;

means for transmitting a frequency-diversity pilot signal along with each of the information signals in each of the polarizations; and means for receiving the signals in each of the polarizations including means including an input and an output for separating from the information signals components of the pilot signals received in each of the polarizations, means for processing the components of the pilot signals and for forming therefrom control signals proportional to the degree of correction required to cancel the crosstalk induced between the polarizations during transmission and reception, and means responsive to said control signal forming means for correcting the received information signals to cancel the crosstalk automatically, said correcting means comprising an electrical control circuit including an input and an output, means for applying the information signals received in each of the polarizations to the input of said circuit, means for selectively varying the amplitude and phase of said information signals in response to the control signals, and means for additively combining said information signals to generate at the output of said circuit information signals devoid of the crosstalk.

2. A polarization diversity transmission system according to claim 1 in which said electrical control circuit of said correcting means is a feedback circuit, the output of which is serailly connected to the input of said pilot signal separating means.

3. A polarization diversity transmission system according to claim 1 in which said electrical control circuit of said correcting means is a feed-forward circuit, the input of which is serially connected to the output of said pilot signal separating means.

4. A polarization diversity transmission system according to claim 1 in which:

said information signal transmitting means transmits two information signals $A_1$ and $A_2$ in two distinct linear polarizations;

said pilot signal transmitting means transmits two pilot signals along with the two information signals in each of the two polarizations, one pilot signal at a frequency $f_1$ and the other pilot signal at a frequency $f_2$, where $f_1$ is not equal to $f_2$;

said received information signals are of the forms $S_1$ and $S_2$respectively, where $S_1 = V_{11}A_1+V_{21}A_2$ $S_2 = V_{12}A_1 + V_{22}A_2$ and where $V_{11}$, $V_{12}$, $V_{21}$, and $V_{22}$ are complex coefficients indicative of the level of crosstalk induced between the polarizations during transmission and reception;

the components of the pilot signals received in each of the polarizations are proportional to the coefficients $V_{11}$, $V_{12}$, $V_{21}$, and $V_{22}$, respectively;

said processing and control signal forming means produces control signals $C_{11}$, $C_{12}$, $C_{13}$, $C_{21}$, $C_{22}$, $C_{23}$, respectively, of the form $C_{11} \sim - | V_{12}/V_{11}$ $C_{12} \sim$ the angle of $V_{12}/V_{11}$ $C_{13} \sim |(V_{11}) [1 - (V_{12}V_{21}/V_{11}V_{22}) ]|^{-1}$ $C_{21} \sim - V_{21}/V_{22}$ $C_{22} \sim$ the angle of $V_{21}/V_{22}$ $C_{23} \sim | (V_{22}) (1 - V_{12}V_{21}/V_{11}V_{22}) |$ ;$^{-1}$and said correcting means generates replicas of the transmitted information signals $A_1$ and $A_2$, respectively, according to the form $$A_1=\left(S_1-\frac{V_{21}}{V_{22}}S_2\right)/(V_{11})\left(1-\frac{V_{12}V_{21}}{V_{11}V_{22}}\right)$$

$$A_2=\left(S_2-\frac{V_{12}}{V_{11}}S_2\right)/(V_{22})\left(1-\frac{V_{12}V_{21}}{V_{11}V_{22}}\right).$$

5. A polarization diversity microwave transmission system with apparatus for reducing crosstalk comprising in combination:

means for transmitting microwave information signals $A_1$ and $A_2$ within the same frequency-band and in two distinct linear polarizations;

means for transmitting a pilot signal along with each of the information signals in each of the polarizations, one pilot signal at a frequency $f_1$ and the other pilot signal at a frequency $f_2$, where $f_1$ and $f_2$ are within the frequency-band of the information signals $A_1$ and $A_2$, respectively, and where $f_1$ is not equal to $f_2$;

means for receiving the signals in each of the polarizations, where the received information signals are of the form $S_1 = V_{11}A_1 + V_{21}A_2$ $S_2 = V_{12}A_1 + V_{22}A_2$ and where $V_{11}$, $V_{12}$, $V_{21}$ and $V_{22}$ are complex coefficients indicative of the level of crosstalk induced between the polarizations during transmission, said receiving means further including means for separating components of the pilot signals received in each of the polarizations, said components being proportional to the coefficients $V_{11}$, $V_{12}$, $V_{21}$, $V_{22}$, respectively, means for processing said components and for forming control signals $C_{11}$, $C_{12}$, $C_{13}$, $C_{21}$, $C_{22}$, $C_{23}$, respectively, of the form $C_{11} \sim - | V_{12}/V_{11} |$ $C_{12} \sim$ the angle of $V_{12}/V_{11}$ $C_{13} \sim | (V_{11}) (1 - (V_{12}V_{21}/V_{11}V_{22}))|^{-1}$ $C_{21} \sim - V_{21}/V_{22}$ $C_{22} \sim$ the angle of $V_{21}/V_{22}$ $C_{23} \sim | (V_{22}) (1 - (V_{12}V_{21}/V_{11}V_{22})) |^{-1}$; and correcting means responsive to said control signal forming means for generating replicas of the transmitted information signals $A_1$ and $A_2$ according to the following form $$A_1=\left(S_1-\frac{V_{21}}{V_{22}}\,S_2\right)\Big/(V_{11})\left(1-\frac{V_{12}V_{21}}{V_{11}V_{22}}\right)$$

$$A_1=\left(S_2-\frac{V_{12}}{V_{11}}\,S_2\right)\Big/(V_{22})\left(1-\frac{V_{12}V_{21}}{V_{11}V_{22}}\right).$$

6. A method of reducing crosstalk in a polarization diversity transmission system comprising the steps of:

transmitting information signals in a set of two distinct linear polarizations;

transmitting a frequency-diversity pilot signal along with each of the information signals in each of the polarizations; and receiving the signals in each of the polarizations, said receiving step further including the steps of separating from the information signals components of the pilot signals received in each of the polarizations, processing the components of the pilot signals and forming therefrom control signals proportional to the degree of correction required to cancel the crosstalk induced between the polarizations during transmission and reception, and correcting for the crosstalk between the received information signals, said correcting step including the steps of applying the information signals received in each of the polarizations to the input of an electrical control circuit, selectively varying the amplitude and phase of said information signals in said circuit in response to the control signals and additively combining said information signals to generate at the output of said circuit information signals devoid of the crosstalk.

* * * * *